Oct. 6, 1936.     C. F. MOSELEY     2,056,687

ROD PACKING DEVICE AND ROD GUIDE

Filed Oct. 30, 1935

Inventor

C. F. Moseley

By Barry & Cyr

Attorneys

Patented Oct. 6, 1936

2,056,687

UNITED STATES PATENT OFFICE 2,056,687

ROD PACKING DEVICE AND ROD GUIDE

Charles F. Moseley, Bartlesville, Okla.

Application October 30, 1935, Serial No. 47,504

8 Claims. (Cl. 286—33)

This invention relates to improvements in packing devices, and more especially to novel packing means for use with reciprocating pump rods, wire ropes or the like.

The primary purpose of the invention is to provide a packing device capable of employing packing rings or gaskets made from flat sheets of packing material.

Another object is to furnish a packing device for well pump rods, and including a follower, forming means to counteract pressure from below which tends to lift the packing rings on the up stroke.

A still further object is to supply a packing device including a primary follower member for maintaining the packing rings firmly against the rod.

Another object is to provide a packing device for reciprocating rods so designed that the packing rings may be readily renewed and may also be adjusted from the exterior of the device.

With the foregoing objects outlined and with other objects in view which will appear as the description proceeds, the invention consists in the novel features hereinafter described in detail, illustrated in the accompanying drawing, and more particularly pointed out in the appended claims.

Figure 3:
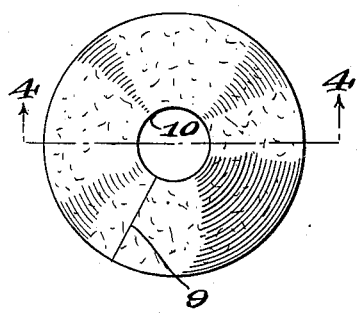
Fig. 3 is a top plan view of one of the packing rings.
Figure 4:
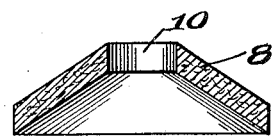
Fig. 4 is a vertical sectional view of the ring, taken on the line 4—4 of Fig. 3.

Referring to the drawing, 5 designates a cup having a depending threaded skirt 6 adapted to be detachably secured to the upper end of a well string, not shown. A pumping rod 7 reciprocates through the cup, and in the latter, I arrange one or more disk-shaped packing rings 8, each of which may be made from a flat sheet of any suitable resilient packing material. As shown, in Fig. 3, each ring is radially split at 9, and at this point, a wedge-shaped segment has been cut from the disk, whereby when the edges of the split are brought together, the disk will assume a substantially cone shape, as shown in Fig. 4. Of course, each disk has an aperture 10 to accommodate the rod 7, and the split in the ring will allow it to be fitted on to the rod from any side thereof, and this will facilitate renewal of worn rings.

As most packing material has some resiliency, I employ a primary follower 11 for placing the rings under pressure in order to keep them pressed firmly against the rod. This follower is preferably of smaller diameter than the inside diameter of the cup 5, and it has peripheral lugs 12 slidably engaging the inner surface of the circular wall of the cup. As the peripheral portions of the rings abut against the last mentioned surface, and the rings rest on the bottom of the cup, it is obvious, if the follower is moved downwardly, it will not only act to clamp the packing rings in the cup, but will function to press the central portions of the rings into firm engagement with the rod. Any suitable means may be used to adjust the follower. For example, ears 13 may be provided on the cup, and ears 14 may project from the upper end of the follower. Bolts 15 having threaded engagement with the ears 13, pass loosely through the ears 14, and nuts 16 on the bolts are used for pressing the follower downwardly.

A secondary follower 17 of tubular form provides bearings for the rod 7, and this follower acts to counteract pressure from below which tends to lift the rings on the up stroke of the rod. In this connection it will be noted that the lower end of the follower 17 has an internal annular recess 18 which merges into a substantially frusto-conical surface 19 at the lower end of the follower. The surface 19 provides an annular abutment for the upper end of the top ring, and the recess 18 permits the tip of the upper ring to recede away from the rod during the up stroke of the latter.

The inner follower 17 may also be adjusted by any suitable means. For example, ears 20 at the top of the follower, loosely receive the bolts 15, and nuts 21 on the bolts are used to depress such follower.

Figure 1:
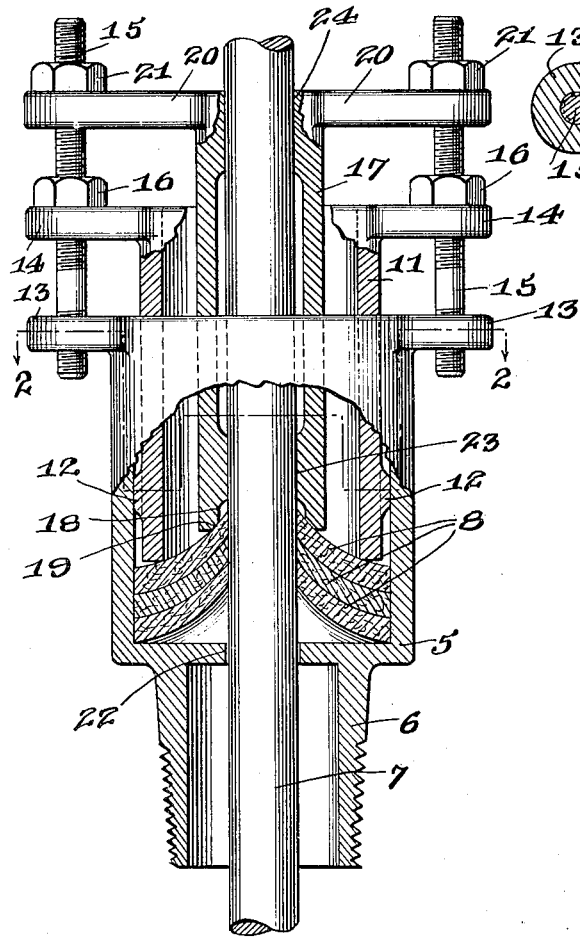
Fig. 1 is a side elevation, partly in vertical section, of my improved device.
Figure 2:
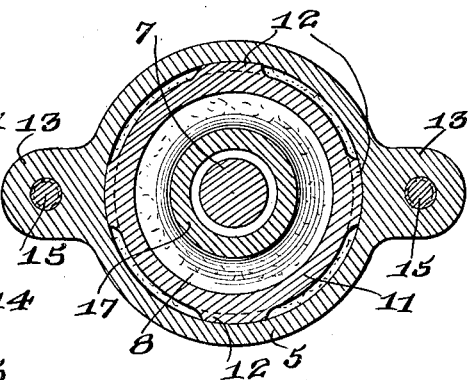
Fig. 2 is a horizontal sectional view of the same, taken on the line 2—2 of Fig. 1.

It will be noted from Fig. 1 that the peripheral portion of the lowermost packing ring 8 rests on an annular supporting surface formed by the bottom of the cup 5, while the peak portion of such ring is spaced from this surface. Consequently when the follower 11 is moved downwardly it not only clamps the rings in position but causes the peak portions of the rings to snugly engage the rod 7. Furthermore, as the rings are formed from flat resilient material they tend to resume a flat shape and in doing this, press against the inner surface and bottom of the cup as well as against the lower end of the follower 11 and the surface of the rod 7.

In accordance with the invention, the resiliency of the packing rings themselves, when placed under pressure by the outer follower 11, is the chief means of keeping them pressed firmly against the rod. When the rings become worn to such an extent that the pressure will not maintain them against the rod, they are no longer effective, and should be replaced. The inner follower, as before stated, is in reality a provision to counteract pressure from below which tends to lift the rings on the up stroke. In actual practice, this follower must not be tightened down too far, as the application of excessive pressure on the packing rings by the inner follower will cause the polish or pump rod or other reciprocating rod to run hot. Therefore, if the inner follower is properly set, as illustrated in Fig. 1, the packing rings will be allowed to flex in and out over irregularities on the rod, instead of being torn by them. Consequently, when such packing is applied to rough or pitted rods, they will in time improve the surfaces of such rods.

Of additional importance in this particular construction is the fact that there are three bearing surfaces through the complete assembly which take the wear of any sidewise motion on the rod. These three bearing surfaces are numbered respectively, 22, 23 and 24.

While I have disclosed my invention in connection with well pumping rods, it will be obvious to those skilled in the art that it may be employed in conjunction with all kinds of reciprocating rods, or wire ropes, and it is manifest that changes may be made in the details disclosed, without departing from the spirit of the invention, as expressed in the claims.

What I claim and desire to secure by Letters Patent is:

1. A reciprocating rod packing device, comprising a cup having an annular supporting surface surrounding said rod and arranged substantially perpendicular to the rod, a hollow substantially frustro-conical resilient packing ring having its peripheral portion engaging said surface and its peak portion spaced from the surface and engaging said rod, adjustable means cooperating with the cup and including an annular surface for clamping the peripheral portion of the packing ring against said supporting surface and for urging the peak portion of the packing ring toward the rod, said annular surface being arranged in close proximity to but spaced from the inner surface of the cup, said annular surface being also spaced from said rod.

2. A reciprocating rod packing device, comprising a cup through which the rod reciprocates, a packing ring formed from flat resilient material and of substantially cone shape surrounding the rod and having its peak portion engaging the rod, and adjustable means cooperating with the cup for clamping the peripheral portion of the packing ring and for urging the peak portion of the latter toward the rod, the last mentioned means including a tubular follower extending into the cup and provided with peripheral lugs slidably engaging the inner surface of the cup, and means arranged exteriorly of the cup for forcing the follower toward the cup.

3. A reciprocating rod packing device, comprising a cup having an annular supporting surface surrounding said rod and arranged substantially perpendicular to the rod, a hollow substantially frustro-conical resilient packing ring having its peripheral portion engaging said surface and its peak portion spaced from the surface and engaging said rod, adjustable means cooperating with the cup for clamping the peripheral portion of the packing ring against said surface and for urging the peak portion of the latter toward the rod, and independent adjustable means cooperating with the outer surface of the peak portion of the packing ring to counteract pressure tending to move the ring away from the rod when the latter is moved in one direction.

4. A reciprocating rod packing device, comprising a cup having an annular supporting surface surrounding said rod and arranged substantially perpendicular to the rod, a hollow substantially frustro-conical resilient packing ring having its peripheral portion engaging said surface and its peak portion spaced from the surface and engaging said rod, adjustable means cooperating with the cup for clamping the peripheral portion of the packing ring against said surface and for urging the peak portion of the latter toward the rod, and other means cooperating with the outer surface of the peak portion of the packing ring to counteract pressure tending to move the ring away from the rod when the latter is moved in one direction, the last-mentioned means comprising a tubular follower surrounding the rod and provided with means exteriorly of the cup for moving the follower toward the packing ring.

5. A combined rod guide and rod packing device, comprising a cup through which the rod extends, hollow packing means including a plurality of packing rings arranged in one end of the cup and surrounding the rod, each packing ring being formed from flat resilient material and being of substantially cone shape with the peak portion of the cone engaging the rod, and with the peripheral portion of the ring engaging the inner surface of the wall of the cup, an outer follower sleeve extending into the cup and cooperating with a portion of the cup for clamping the peripheral portions of the rings in the cup and for pressing the peak portions of the rings into engagement with the rod, and an inner follower sleeve extending into the cup and forming a bearing for the rod, the inner end of the last mentioned follower sleeve acting to counteract pressure which tends to move the rings away from the rod when the latter moves in one direction.

6. A combined rod guide and rod packing device, comprising a cup through which the rod extends, hollow packing means including a plurality of packing rings arranged in one end of the cup and surrounding the rod, each packing ring being formed from flat resilient material and being of substantially cone shape with the peak portion of the cone engaging the rod, and with the peripheral portion of the ring engaging the inner surface of the wall of the cup, an outer follower sleeve extending into the cup and co-operating with a portion of the cup for clamping the peripheral portions of the rings in the cup and for pressing the peak portions of the rings into engagement with the rod, and an inner follower sleeve extending into the cup and forming a bearing for the rod, the inner end of the last mentioned follower sleeve acting to counteract pressure which tends to move the rings away from the rod when the latter moves in one direction, the inner end of the sleeve having a substantially frusto-conical abutment surface for the peak portion of one of said rings and having an adjacent recess to permit the peak portion of the last mentioned ring to recede from the rod.

7. A combined rod guide and rod packing device for wells, comprising a cup adapted to be attached to the top of a well string and provided with a bearing through which the rod reciprocates, packing rings positioned in the bottom portion of the cup and engaging the rod, each ring being of resilient material and being of substantially conical shape, the peripheral portions of the rings engaging the inner surface of the wall of the cup, a follower sleeve extending into the cup and having its lower end spaced from the wall of the cup and bearing against the upper surface of the upper ring for clamping the rings in the cup and urging the central portions of the rings into engagement with the rod, an inner guide sleeve surrounding the rod and forming upper and lower bearings for the latter, the last mentioned sleeve extending into the cup and having its lower end in engagement with the central portion of the upper packing ring to counteract pressure from below tending to lift the rings on the up stroke of the rod, and independent means for moving said sleeves toward the cup.

8. In combination, an upstanding cup having a vertical reciprocating rod extending therethrough, a plurality of packing rings positioned in the bottom portion of the cup and having their peripheral portions engaging the inner surface of the side wall of the cup, each ring being of split construction and formed from substantially flat resilient material and being of substantially conical form, the central portions of the rings engaging the rod, an outer follower sleeve extending into the cup and having its lower end spaced from the inner surface of the cup and engaging the upper surface of the uppermost ring for clamping the rings in the cup and yieldingly urging their central portions toward the rod, an inner follower sleeve forming bearing means for the rod and having its lower end positioned to be engaged by the central portion of the upper ring to counteract pressure from below tending to lift the rings on the up stroke of the rod, bolts secured to the cup and extending upwardly loosely through the upper ends of the outer and inner follower sleeves, nuts on the bolts engaging the upper end of the outer follower for moving the latter toward the cup, and other nuts on the bolts engaging the upper end of the inner follower for moving the latter toward the cup independently of the outer follower.

CHARLES F. MOSELEY.